Patented Sept. 20, 1938

2,130,572

UNITED STATES PATENT OFFICE 2,130,572

LAYERS CONTAINING BLEACHING-OUT DYES

Bruno Wendt, Dessau in Anhalt, Germany, assignor to Agfa Ansco Corporation, Binghamton, N. Y., a corporation of New York No Drawing. Application July 17, 1933, Serial No. 680,893. In Germany July 21, 1932

15 Claims. (Cl. 95—7)

My present invention relates to layers containing bleaching-out dyes and more particularly to such layers as are used for photographic purposes.

One of its objects is to effect the new layers containing bleaching-out dyes. Further objects will be seen from the detailed specification following hereafter.

It is known that bleaching-out dyestuffs incorporated in gelatin layers can be rendered more stable to light after printing of the picture, by a mordanting process. The use of gelatin as a binding agent, however, excludes a great number of dyestuffs which, though they have excellent bleaching-out properties, are not sufficiently soluble in water, so that they cannot be mixed with aqueous solutions of gelatin. For these dyestuffs a binding agent is necessary which is soluble in the organic solvent for the dyestuff, but on the other hand yields a layer which sufficiently swells in water so that an aqueous solution of, for instance, tannin and tartar emetic can be used for the mordanting process.

According to the present invention photographic layers for the bleaching-out process are made by incorporating bleaching-out dyestuffs in a layer of cellulose ester, cellulose ether or cellulose ether-ester in which the cellulose is incompletely acylated or etherified. Such hydrolyzed cellulose derivatives may be obtained by partially hydrolyzing a cellulose ester of sufficiently high degree of acylation or a cellulose alkyl ether of sufficiently high degree of alkylation or by hydrolyzing a suitable cellulose ether ester. These hydrolyzed products are soluble in organic solvents and their capacity of swelling in water increases in proportion as their degree of hydrolysis is increased. Specially suitable for the purpose of the invention is a hydrolyzed cellulose acetate with a content of acetyl corresponding to 44 to 48 per cent of acetic acid. This cellulose acetate is soluble in a mixture of methanol and methylene chloride having the proportion of 3:5 to 3:8 parts by volume. This mixture is also a solvent for all the basic bleaching-out dyestuffs that are sparingly soluble or insoluble in water. Thus these dyes can be mixed without difficulty with the solution of cellulose acetate.

The following examples illustrate the invention:

*Example 1.*—The casting solution for the bleaching-out layer is prepared by swelling 30 grams of hydrolyzed cellulose acetate having an acetyl content corresponding to 46 per cent of acetic acid in 240 cc. of methylene chloride. Then there are added the following solutions:

80 milligrams of Nile blue in 30 cc. of methanol
60 milligrams of seleno-pyronine, prepared from monoethyl-o-phenetidine, in 30 cc. of methanol,
90 milligrams of resorcin-benzoin-dimethylether-boron fluoride in 10 cc. of methanol,
5 grams of maleic acid in 10 cc. of methanol,
5 grams of diethylallylthiourea in 10 cc. of methanol.

After addition of any of these solutions the hydrolyzed acetate dissolves very rapidly. After filtering, the solution is applied to baryta paper.

The layer thus formed is exposed through a pattern. The picture obtained is fixed by treating it for 15 minutes with a 25 per cent aqueous solution of tannic acid, then for
5 minutes with water, and for
5 minutes with a 5 per cent aqueous solution of tartar emetic whereupon it is treated if required for 5 minutes with a 50 per cent solution of alcohol in order to remove the thiourea derivative.

*Example 2.*—An ethyl cellulose containing still about 75 per cent of the theoretically possible ethyl groups is dissolved in alcohol of 90 per cent strength. To this solution there is added 1/200 part by weight of the ethyl cellulose employed of the dye Brilliant Green (Schultz Farbstofftabellen 7th edition, Vol. I, No. 760) and 1/20 part by weight of the ethylcellulose employed of diallylthiourea as sensitizer in about the same proportion in relation to the ethyl cellulose as described in Example 1.

The solution is applied to paper or another suitable support. After drying the layer is exposed under a positive and fixed with tannic acid and tartar emetic.

*Example 3.*—A cellulose butyrate which has been saponified so as to contain only 2 to 2½ groups of butyric acid instead of three cellulose is dissolved in methanol. After the addition of a methanolic solution of 1/100 part by weight of methylviolet and 1/8 part by weight of thiosinamine of the cellulose butyrate employed the mixture is cast on paper. The picture is produced in the layer sensitive to yellow green light in the manner described in Example 2.

The invention is not limited to the foregoing examples or to the specific details given therein, but contemplates as included all such modifications and equivalents as fall within the scope of the appended claims.

What I claim is:

1. A process of producing layers for the bleaching-out process which comprises dissolving in an organic solvent a cellulose derivative selected from the group consisting of organic cellulose esters, cellulose ethers and cellulose ether-esters having sufficient free hydroxyl groups in the cellulose nucleus so that it substantially swells in water and a bleaching-out dye, and casting a layer from said solution.

2. A process of producing layers for the bleaching out process which comprises dissolving in an organic solvent a cellulose derivative selected from the group consisting of organic cellulose esters, cellulose ethers and cellulose ether esters having sufficient free hydroxyl groups in the cellulose nucleus so that it substantially swells in water and a bleaching-out dye at least difficultly soluble in water, and casting a layer from said solution.

3. A process of producing layers for the bleaching-out process which comprises dissolving in an organic solvent a cellulose derivative selected from the group consisting of organic cellulose esters, cellulose ethers, and cellulose ether-esters having sufficient free hydroxyl groups in the cellulose nucleus so that it substantially swells in water a sensitizer, a stabilizer and a bleaching-out dye, and casting a layer from said solution.

4. A process of producing layers for the bleaching-out process which comprises dissolving in an organic solvent a cellulose derivative selected from the group consisting of organic cellulose esters, cellulose ethers and cellulose ether-esters having sufficient free hydroxyl groups in the cellulose nucleus so that it substantially swells in water, a sensitizer, a stabilizer and a bleaching-out dye, and casting a layer from said solution.

5. A process of producing layers for the bleaching out process which comprises dissolving in an organic solvent a cellulose derivative selected from the group consisting of organic cellulose esters, cellulose ethers and cellulose ether esters having sufficient free hydroxyl groups in the cellulose nucleus so that it substantially swells in water, a sensitizer at least difficultly soluble in water and a bleaching-out dye and casting a layer from said solution.

6. A homogeneous photographic layer consisting of a compound selected from the group consisting of organic cellulose esters, mixed cellulose esters, cellulose ethers and cellulose ester-ethers having throughout its whole thickness sufficient free hydroxyl groups in the cellulose nucleus so that it substantially swells in water and having a bleaching-out dye uniformly distributed in said layer.

7. A homogeneous photographic layer consisting of a compound selected from the group consisting of organic cellulose esters, mixed cellulose esters, cellulose ethers and cellulose ester-ethers having throughout its whole thickness sufficient free hydroxyl groups in the cellulose nucleus so that it substantially swells in water and having uniformly distributed in said layer a bleaching-out dye which is at least difficultly soluble in water.

8. A homogeneous photographic layer consisting of a compound selected from the group consisting of organic cellulose esters, mixed cellulose esters, cellulose ethers and cellulose ester-ethers having throughout its whole thickness sufficient free hydroxyl groups in the cellulose nucleus so that it substantially swells in water and having a bleaching-out dye and a sensitizer both uniformly distributed in said layer.

9. A homogeneous photographic layer consisting of a compound selected from the group consisting of organic cellulose esters, mixed cellulose esters, cellulose ethers and cellulose ester-ethers having throughout its whole thickness sufficient free hydroxyl groups in the cellulose nucleus so that it substantially swells in water and having uniformly distributed in said layer a bleaching-out dye and a sensitizer at least difficultly soluble in water.

10. A homogeneous photographic layer consisting of cellulose acetate having throughout its whole thickness sufficiently less acetyl radicals linked to the oxygen of the reactive hydroxyl groups of the cellulose nucleus than can theoretically be bound so that it substantially swells in water and having a bleaching-out dye uniformly distributed in said layer.

11. A homogeneous photographic layer consisting of cellulose acetate containing throughout its whole thickness 44 to 50% of acetyl and having a bleaching-out dye uniformly distributed in said layer.

12. A homogeneous photographic layer consisting of cellulose acetate containing throughout its whole thickness 46% of acetyl and having a bleaching-out dye uniformly distributed in said layer.

13. A homogeneous photographic layer consisting of cellulose acetate containing throughout its whole thickness 46% of acetyl and having diethylaminophenoaminonaphthazoxoniumsulfate uniformly distributed in said layer.

14. A photographic layer comprising cellulose butyrate having 2½ butyryl radicals linked to the oxygen of the hydroxyl groups of one cellulose nucleus as the exclusive binding agent and a bleaching-out dye uniformly distributed in said cellulose butyrate.

15. A photographic layer comprising ethyl cellulose having sufficiently less ethyl radicals bound to the oxygen of the reactive hydroxyl groups of the cellulose nucleus than can theoretically be bound so that it substantially swells in water as the exclusive binding agent, and a bleaching-out dye uniformly distributed in said ethyl cellulose.

BRUNO WENDT.